United States Patent [19]
Kim

[11] Patent Number: 5,931,029
[45] Date of Patent: Aug. 3, 1999

[54] AGITATOR MECHANISM FOR A CLOTHES WASHING MACHINE

[75] Inventor: Sung-Min Kim, Suwon, Rep. of Korea

[73] Assignee: Samsung Electronics Co., Ltd., Suwon, Rep. of Korea

[21] Appl. No.: 08/868,669

[22] Filed: Jun. 4, 1997

[30] Foreign Application Priority Data

Jun. 12, 1996 [KR] Rep. of Korea ...................... 96-21107

[51] Int. Cl.⁶ .................................................. D06F 37/30
[52] U.S. Cl. ............................................... 68/134; 68/133
[58] Field of Search ............................ 134/53, 134, 133

[56] References Cited

U.S. PATENT DOCUMENTS

| | | | |
|---|---|---|---|
| 4,048,820 | 9/1977 | Pielemier | 68/133 |
| 4,520,638 | 6/1985 | Brenner | 68/133 |
| 5,596,891 | 1/1997 | Bae et al. | 68/133 |
| 5,619,870 | 4/1997 | Kim et al. | 68/133 |
| 5,675,996 | 10/1997 | Cho | 68/134 |
| 5,722,265 | 3/1998 | Cho | 68/133 |
| 5,727,403 | 3/1998 | Na | 68/133 |
| 5,765,406 | 6/1998 | Youn | 68/134 |

FOREIGN PATENT DOCUMENTS

| | | | |
|---|---|---|---|
| 513315 | 9/1954 | Belgium | 68/133 |
| 1-146575 | 6/1989 | Japan | 68/133 |
| 410924 | 5/1934 | United Kingdom | 68/133 |

*Primary Examiner*—Frankie L. Stinson
*Attorney, Agent, or Firm*—Burns, Doane, Swecker & Mathis, L.L.P.

[57] ABSTRACT

A clothes washing machine includes a spin basket and a water-agitating mechanism mounted at the bottom thereof. The water-agitating mechanism includes an agitator having radial blades, and a wash baton projecting upwardly from a center region of the agitator. The agitator and wash baton are rotatable relative to one another about a common vertical axis. A drive mechanism oscillates the agitator and wash baton relative to one another such that the agitator and wash baton rotate in opposite directions for maximizing the agitation of the water.

4 Claims, 5 Drawing Sheets

AGITATOR MECHANISM FOR A CLOTHES WASHING MACHINE

BACKGROUND OF THE INVENTION (1) Field of the Invention

The present invention generally relates to a washing machine. More particularly, it relates to a washing machine having a driving device which rotates a water agitating machine, installed within a spin basket.

(2) Description of the Prior Art

A common-type washing machine includes a microcomputer which holds a specific program to control the overall operation of the washing machine, i.e. washing, rinsing, hydro-extracting, and draining processes, and a control panel through which a user selects one of the above-described processes. Accordingly, once the user selects the desired process, clothes are washed automatically according to the program held in the microcomputer.

As shown in FIG. 1, the washing machine has a housing 10, a tub 20 mounted within the housing 10 to contain water, a spin basket 30 rotatably installed in the tub 20, and an agitator 40 installed on the bottom of the spin basket 30 to rotate forward and reversely.

The agitator 40 consists of a body 41, a blade assembly 42 comprised of a plurality of blades radially formed on the top of the body 41, and a wash baton 43 installed on the center of body 41 and protruding upward. The agitator 40 generates the suds and tumbles the clothes through the water by agitation during the washing and rinsing steps.

A driving device 60 is installed on the bottom of the tub 20 to rotate the agitator 40 and the spin basket 30. The driving device 60 includes a motor 61 that generates rotating force, and a power transmission 62 which selectively transmits the rotating force, produced by the motor 61, to the agitator 40 and the spin basket 30 by way of a belt 63. A rotating shaft 50 is provided between the power transmission 62 and the agitator 40, and the agitator 40 rotates about the rotating shaft 50.

Once the motor 61 is put into action after clothes and water are respectively placed into the conventional washing machine's spin basket 30 and tub 20, the agitator 40 rotates forward and reversely, and the laundry is agitated through the water. Accordingly, soil is removed from the laundry as the laundry rubs against the inner wall of the spin basket and the wash baton 43 by the water current. In the hydro-extracting process the spin basket 30 rotates at high speeds and removes excess water from the clothes, thus leaving the clothes only damp. The program that controls these washing steps is stored in the microcomputer, as described previously.

According to the conventional washing machine, the agitator 40 is of simple construction, as described above, the blade assembly 42 having the plurality of blades radially formed on the top of its body 41, and the wash baton 43 integrally formed on the center of the blade assembly 42, protruding upward therefrom, in order to create the water current. Since the rotational direction of the laundry is the same as that of the agitator during the washing and rinsing steps, the effect of friction between the laundry and the water is small, so the conventional washing machine cannot assure thorough cleansing action.

SUMMARY OF THE INVENTION

The present invention encompasses a washing machine that obviates the above-described problems and disadvantages of the conventional art.

It is an objective of the present invention to provide a washing machine that includes first and second driving means which rotate the washing machine's agitator and wash baton independently of each other, and allow the agitator and the wash baton to rotate in different directions to increase the effect of friction between the water and the clothes to be washed, thereby offering a more thorough cleansing action.

In order to obtain the above-mentioned objective, there is disclosed a washing machine including a housing having a spin basket; an agitator installed on the spin basket's bottom to create a water current; a wash baton installed protruding upward and rotatable independently of the agitator; a first driving means rotating the agitator; and a second driving means rotating the wash baton.

The first driving means includes first stators and a first rotor that is rotating by interacting with the first stators, thus turning the agitator, and the second driving means includes second stators and a second rotor that rotates by interacting with the second stators, thus turning the wash baton. The first and second stators are integrally formed in a ring shape, the second stators being placed inside while the first stators are positioned outside, and a non-magnetic body is interposed between the first and second stators in order to separate the first stators' magnetic field from that of the second stators. A plurality of permanent magnets are symmetrically provided to the first rotor's inner circumference and the second rotor's outer circumference to create a magnetic field, thus making the first and second rotors rotate by the electromagnetic force created by the interaction with their corresponding stators.

DETAILED DESCRIPTION OF THE PREFERRED EMBODIMENT

The preferred embodiment of the present invention will now be described in detail with reference to the accompanying drawings.

Figure 1:
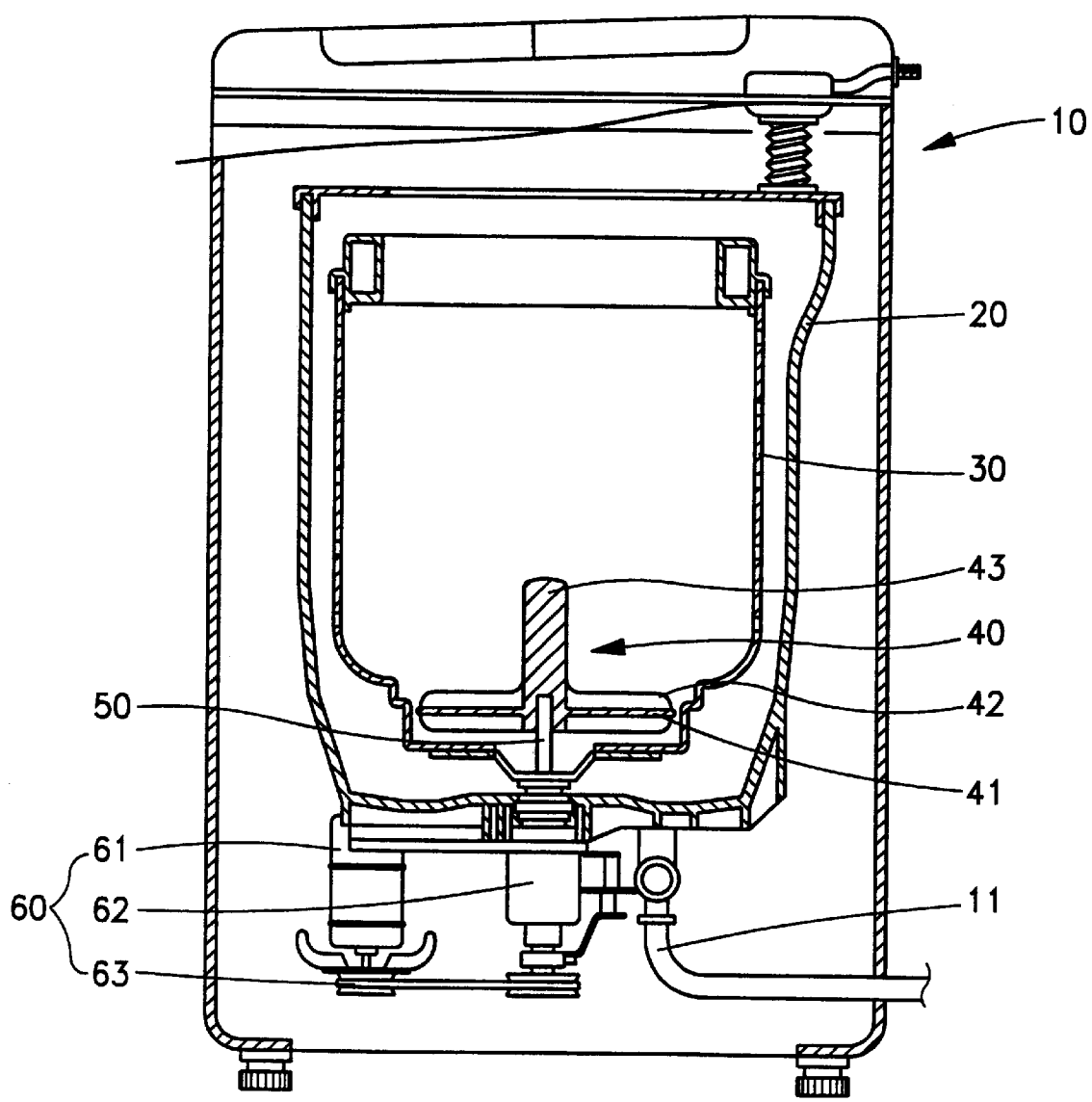
FIG. 1 is a longitudinal-sectional view of a washing machine in accordance with a conventional art.
Figure 2:
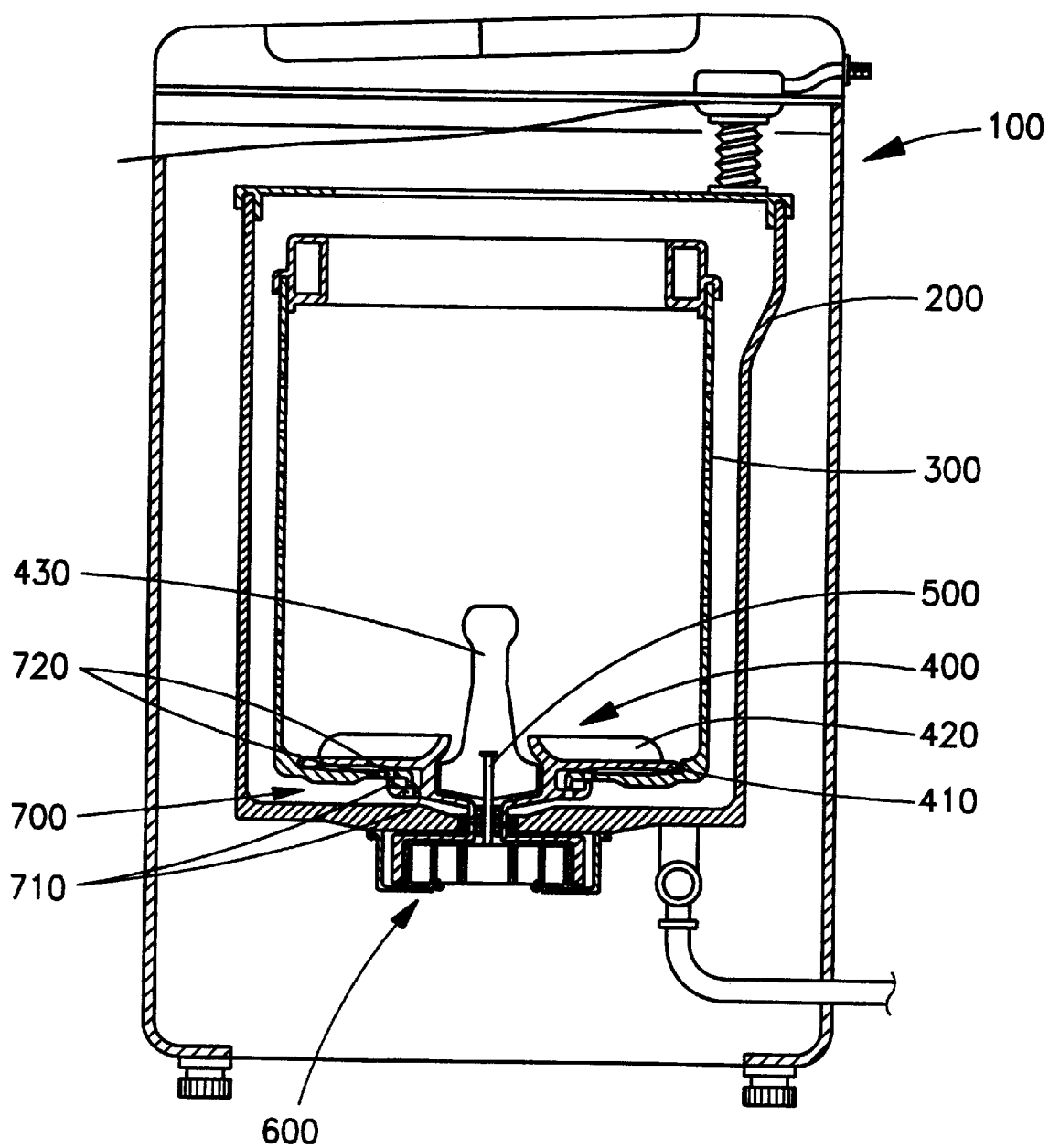
FIG. 2 is a longitudinal-sectional view of a washing machine in accordance with the present invention.
Figure 3:
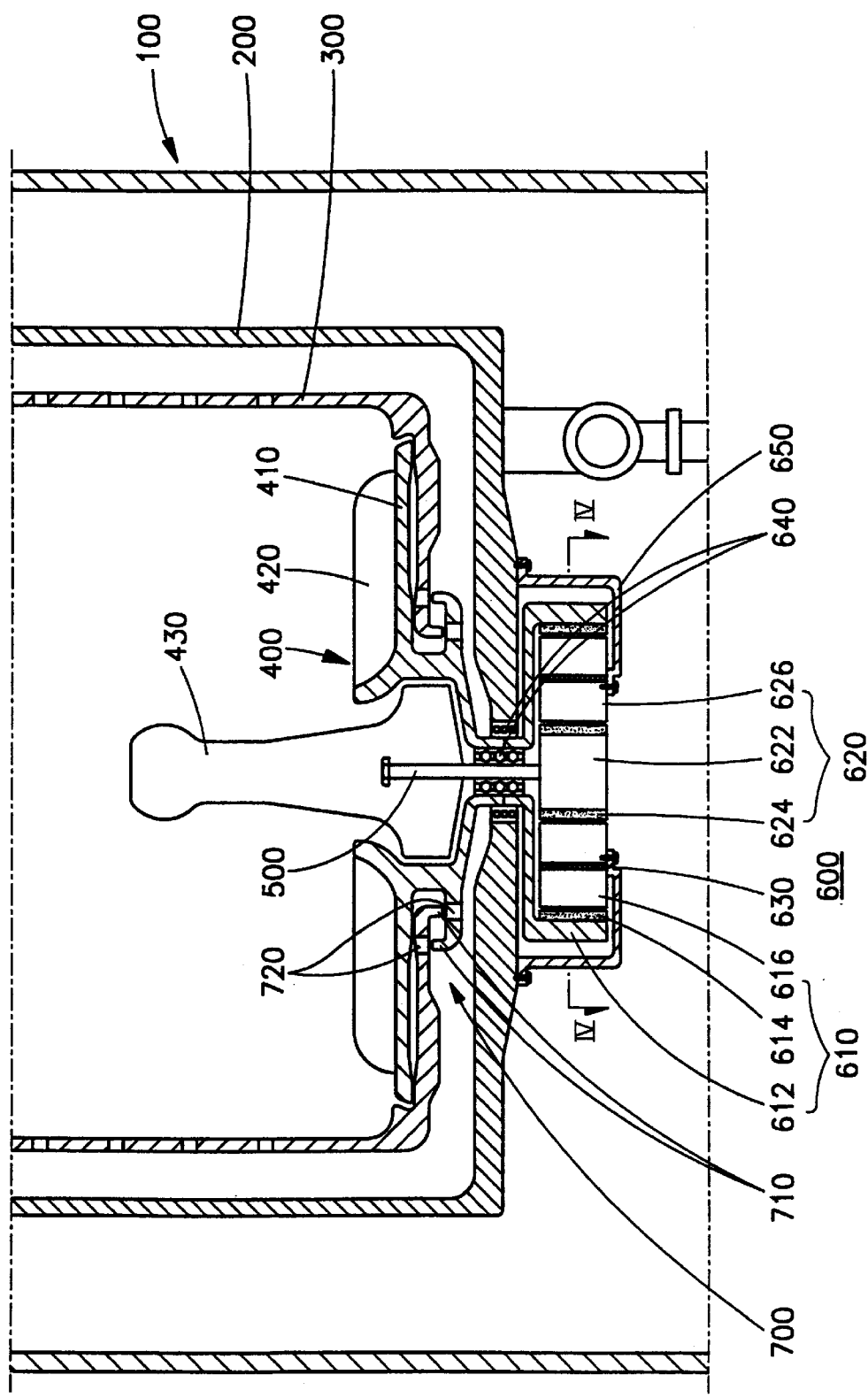
FIG. 3 is a sectional view of a driving device in accordance with the present invention.
Figure 4:
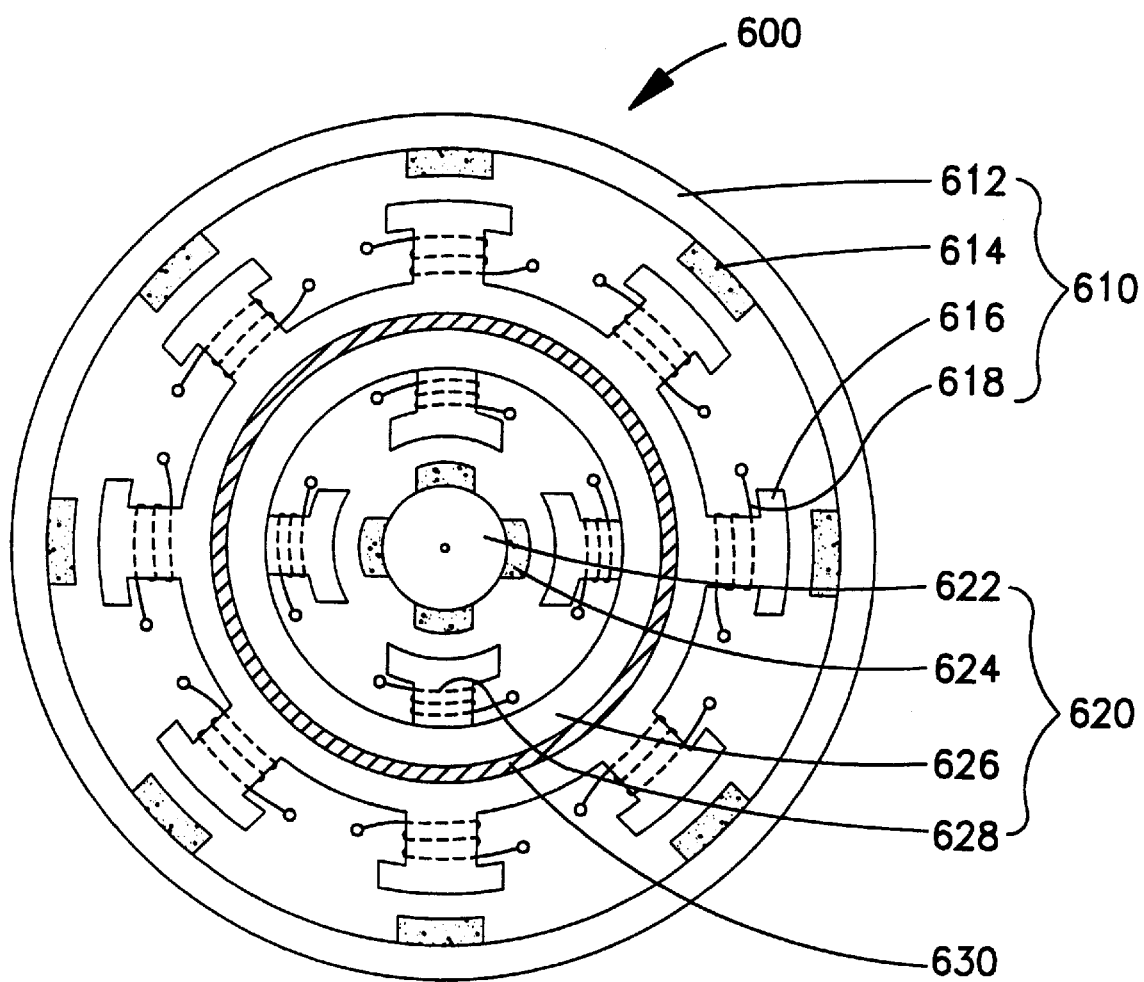
FIG. 4 is a sectional view taken along line IV—IV of FIG. 3.

FIG. 2 is a longitudinal-sectional view of a washing machine in accordance with the present invention, and FIG. 3 is a sectional view of the inventive driving device for rotating the washing machine's agitator and wash baton. FIG. 4 is a sectional view of the driving device in accordance with the present invention.

As depicted in the drawings, the washing machine of the present invention includes a tub 200 which is mounted in a housing 100 to hold water for washing, a spin basket 300 that is rotatably installed in the tub 200, and an agitator 400 with a blade assembly 420 which is provided to the bottom of the spin basket 300 to be capable of rotating forward and reversely. The agitator 400 may be joined to or disjoined from the spin basket 300 by a pair of clutches 700. The clutch 700 is realized as catches 710 and grooves 720, each formed on one end of the respective agitator 400 and spin basket 300, so the catches 710 of the agitator 400 and spin basket 300 mate into the corresponding grooves 720.

Once the water flows into the spin basket 300, the buoyant force makes the spin basket 300 rise to a predetermined point, and the catches 710 and grooves 720 are separated from each other. When the water drains from the tub 200, the spin basket 300 returns to its original position so that the catches 710 mate into the corresponding grooves 720. A wash baton 430 is installed on the center of the agitator 400 protruding upward, and can turn forward and reversely, independently of the agitator 400.

The following description relates to a driving device 600 for driving the agitator 400 and the wash baton 430.

Referring to FIGS. 3 and 4, the driving device 600 of the present invention, installed under the tub 200, includes a first driving means 610, a second driving means 620 mounted within the first driving means 610, and a non-magnetic body 630 inserted between the first driving means 610 and the second driving means 620. The first driving means 610 consists of a first rotor 612 that rotates the agitator 400, a plurality of permanent magnets 614 provided to the first rotor 612 and arranged equidistant from each other, first stators 616 that are spaced a predetermined distance away from each other inside of the first rotors 612, and coils 618 wound around the respective first stators 616.

The second driving means 620 is realized as a second rotor 622, rotating the wash baton 430, a plurality of permanent magnets 624 provided to the second rotor 622 equidistant from each other, second stators 626, spaced a predetermined distance away from each other outside of the second rotor 622, and coils 628 wound around the second stators 616, respectively.

The non-magnetic body 630 is formed to a predetermined thickness and interposed between the first stators 616 of the first driving means 610 and the second stators 626 of the second driving means 620. The first stators 616, the second stators 626 and the non-magnetic body 630 are formed as a single piece. Therefore, loops of magnetic flux, each created around the first stators 616 and the second stators 626 by the non-magnetic body 630, do not have influence upon one another. Since the loops of magnetic flux are independently created around the first stators 616 and the second stators 626 by the non-magnetic body 630, the first rotor 612 of the first driving means 610 may rotate independently of the second rotor 622 of the second driving means 620.

The first rotor 612, which is of a cylindrical shape, is positioned spaced a predetermined distance away from the outer surfaces of the first stators 616. The upper end of the first rotor 612 constitutes a hollow shaft, connected with the agitator 400. A plurality of the permanent magnets 614 are symmetrically arranged on the inner circumference of the first rotor 612 in order that the first rotor 612 interacts with the first stators 616, having the coils 618, to be related thereby. Accordingly, the agitator 400 is rotated forward and reversely by the first rotor 612.

The second rotor 622 is formed to be spaced away from the second stators 626, and is connected to the wash baton 430 by a shaft 500. A plurality of the permanent magnets 624 are symmetrically arranged on the outer circumference of the second rotor 622 in order that the second rotor 622 interacts with the second stators 626, having the coils 628, to be rotated thereby.

Bearings 640 make the first rotor 612 and the shaft 500 rotate smoothly, and brackets 650 facilitate installation of the first driving means 610.

Figure 5:
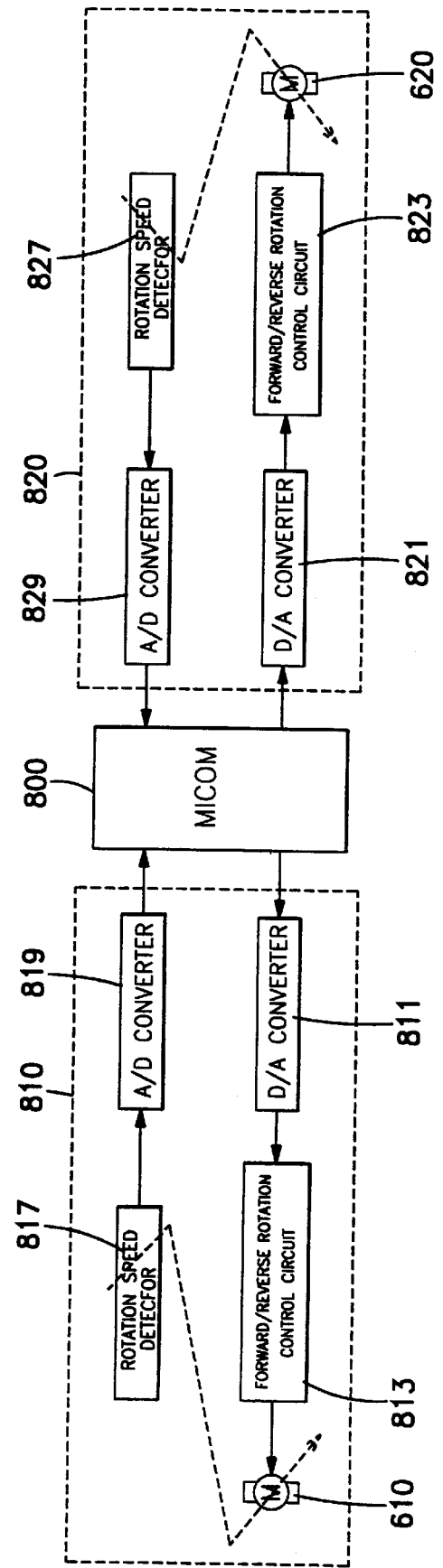
FIG. 5 is a block diagram of a driving device control mechanism for controlling the driving device of the washing machine in accordance with the present invention.

FIG. 5 is a block diagram of a driving device control mechanism for controlling the driving device 600 of the washing machine in accordance with the present invention.

The driving device control mechanism includes a microcomputer (micom) 800, and a first driving means control circuit 810, and a second driving means control circuit 820.

The first driving means control circuit 810 has a digital-analog converter 811 that receives a digital signal indicative of a rotation speed from the micom 800 and converts it to an analog signal; a forward/reverse rotation control circuit 813 which controls the rotation direction of the first driving means 610 according to the input direction of the signal transmitted from the digital-analog converter 811; the first driving means 610 whose rotation direction is controlled by the forward/reverse rotation control circuit 813; a rotation speed detector 817 that detects the speed of the first driving means 610; and an anlog-digital converter 819 that converts an analog voltage signal from the rotation speed detector 817 into a digital frequency signal and transmits it to the micom 800.

Likewise, the second driving means control circuit 820 has an analog-digital converter 821, a forward/reverse rotation control circuit 823, the second driving means 620, a rotation speed detector 827, and a digital-analog converter 829.

Each of the forward/reverse rotation control circuits 813 and 823 is realized as an electronic circuit (not illustrated), and this electronic circuit has two terminals receiving signals from the respective digital-analog converters 811 and 821. The flow of the electric current, applied to each first and second driving means 610 and 620, depends on the terminal to which the signals are input. Thus, if the direction of the electric current, applied to each first and second driving means 610 and 620, is changed, the rotation direction of the respective first and second driving means 610 and 620 is changed, too.

The following description is about the operation of the washing machine in accordance with the present invention.

Once power is applied to the washing machine after clothes and water are put into the spin basket 300, electric current flows across the coils 618 and 628, respectively wound around the stators 616 and 626 thereby creating magnetic fields. The magnetic fields respectively act on the first rotor 612 and the second rotor 622 to thereby rotate them in such a manner that the agitator 400 and the wash baton 430, respectively connected with the first rotor 612 and the second rotor 622, are rotated.

The operation of the driving device 600 is now described in detail referring to FIG. 5.

The agitator 400 and the wash baton 430 rotate in different directions during the washing process for establishing a cleansing action by making the first driving means 610 and the second driving means 620, connected to the agitator 400 and the wash baton 430, respectively rotate in different directions.

In order to realize this, digital signals, indicative of the rotation speed, from the micom 800 are applied to the digital-analog converters 811 and 821 of the first and second driving means control circuits 810 and 820, thereby causing, the first and second driving means 610 and 620 to go into action. These rotation speed signals serve as ON-signals for controlling the operation of each driving means 610 and 620, as well as signals for controlling the number of rotation of the respective first and second driving means 610 and 620. Signals applied to each of the digital-analog converters 811 and 821 are each converted into analog square-wave pulses, and delivered to the forward/reverse rotation control circuits 813 and 823, respectively. Each square-wave pulse is input to any one of the two terminals of each forward/reverse rotation control circuit 813 and 823, which determines the rotation direction. A pulse is input to each input terminal of the forward/reverse rotation control circuits 813 and 823, thus determining the flow of electric current that is input to the first and the second driving means 610 and 620. The rotation directions of the first and second driving means 610 and 620 are determined according to the flow of the electric current that is input to the respective first and second driving means 610 and 620. A signal for determining the rotation direction is included in the rotation speed signals produced by the micom 800.

Therefore, if the square-wave pulse is input to different input terminals of the respective forward/reverse rotation control circuits 813 and 823, the first driving means 610 and the second driving means 620 rotate in different directions. In case that the square-wave pulse is input to the same input terminals of the respective forward/reverse rotation control circuits 813 and 823, the first driving means 610 and the second driving means 620 rotate in the same direction. The rotation direction of each of first and second driving means 610 and 620 is controlled according to the specific program that has been stored in the micom 800, thus making and the first and second driving means 610 and 620 rotate in different directions. Accordingly, the agitator 400, connected to the first driving means 610, and the wash baton 430, connected to the second driving means 620, are turned in different directions. The respective rotation speed detectors 817 and 827 detect the rotation direction and rotation speed of the respective first and second driving means 610 and 620 as a voltage signal, and apply resultant output signals to the corresponding analog-digital converters 819 and 829.

The analog-digital converters 819 and 829 convert the voltage signals into frequency signals, respectively, and apply them to the micom 800. The micom 800 compares the output signals of the analog-digital converters 819 and 829 with the signals, transmitted to the digital-analog converters 811 and 821, respectively, thus controlling the first and second driving means 610 and 620.

During the hydro-extracting process, the agitator 400 rotates while being engaged with the bottom of the spin basket 300, In order to realize this, a rotation speed signal is applied only to the analog converter 811 of the first driving means control circuit thereby rotating only the first driving means 610.

The operation, rotation speed and rotation direction of the agitator 400 and wash baton 430, each connected to the first and second driving means 610 and 620, may be supervised by controlling the operation, rotation direction and rotation speed of the respective first and second driving means 610 and 620 that constitute the driving device 600.

In the washing machine equipped with the present invention, the agitator 400 and the wash baton 430 can rotate in different directions to create a powerful water current, thus doubling the effect of friction between the water current and laundry. Thus, the present invention provides a more thorough cleansing action.

What is claimed is:

1. A clothes washing machine comprising:

a housing;

a spin basket mounted in the housing;

a water-agitating mechanism disposed at a bottom of the spin basket and including:

a rotatable agitator having generally radial blades, and being rotatable about a vertical axis, and a rotatable wash baton extending upwardly from a generally central region of the agitator and being rotatable relative to the agitator about the axis; and a drive arrangement for rotating the water agitating mechanism, the drive arrangement including first and second drive mechanisms for respectively rotating the agitator and the baton simultaneously in opposite directions with respect to one another.

2. A clothes washing machine comprising:

a housing;

a spin basket mounted in the housing;

a water-agitating mechanism disposed at a bottom of the spin basket and including:

a rotatable agitator having generally radial blades, and a rotatable wash baton extending upwardly from a generally central region of the agitator and being rotatable relative to the agitator; and a drive mechanism for rotating the agitator and wash baton relative to one another, wherein the drive mechanism includes first and second drive sections; the first drive section including first stators, and a first rotor driven by the first stators, the first rotor being drivingly connected to the agitator; the second drive section including second stators, and a second rotor driven by the second stators, the second rotor being drivingly connected to the wash baton.

3. The clothes washing machine according to claim 2 wherein the first stators are arranged in a first ring pattern, and the second stators are arranged in a second ring pattern; the second ring pattern disposed inside of the first ring pattern; a non-magnetic body interposed between the first and second ring patterns to isolate magnetic fluxes of the first and second ring patterns from one another.

4. The clothes washing machine according to claim 3 wherein the first drive section further comprises a plurality of first permanent magnets mounted on the first rotor; and the second drive section further comprises a plurality of second permanent magnets mounted on the second rotor.

\* \* \* \* \*